United States Patent
Findeklee

[15] 3,651,767
[45] Mar. 28, 1972

[54] MULTI-STEP ENTRY PARTICULARLY FOR VEHICLES

[72] Inventor: Heinz Findeklee, Salzgitter-Lebenstedt, Germany

[73] Assignee: Linke-Hofmann-Busch Waggon-Fahrreug-Maschinen GmbH Postfach, Salzgitter-Watenstedt, Germany

[22] Filed: July 22, 1970

[21] Appl. No.: 57,118

[52] U.S. Cl. .............................................. 105/448, 280/166
[51] Int. Cl. .......................................................... B61d 23/02
[58] Field of Search ........................................ 105/445–450; 280/166

[56] References Cited

UNITED STATES PATENTS

| | | | |
|---|---|---|---|
| 1,143,433 | 6/1915 | Quiggle | 105/448 |
| 1,301,761 | 4/1919 | Stratton | 105/447 |
| 1,135,141 | 4/1915 | Schrage | 105/447 |

*Primary Examiner*—Arthur L. LaPoint
*Assistant Examiner*—Richard A. Bertsch
*Attorney*—McGlew and Toren

[57] ABSTRACT

A multistep construction particularly for rail vehicles comprises a fixed lower step and a step which is movable for bridging the differing entering heights between the fixed lower step and the floor of the vehicle. The movable step is connected to a lever mechanism in the form of two pivotal lever elements connected at their upper end to the step and at their lower end to a shaft which is rotated by a moving member such as a piston and cylinder combination. The movable step itself is guided by rollers carried on an arm portion which engage in an inclined or oblique trackway defined in wall panels on each side of the entrance passageway. The step carries an apron which is articulated to the front and depends downwardly therefrom. The lever mechanism includes a rod member which is pivoted to the mechanism and to the apron and which provides an inward and outward guidance of the apron during lowering and raising of the step.

5 Claims, 3 Drawing Figures

INVENTOR.
HEINZ FINDEKLEE

BY

McGlew & Toren
ATTORNEYS 3,651,767

MULTISTEP ENTRY PARTICULARLY FOR VEHICLES

SUMMARY OF THE INVENTION

This invention relates in general to the construction of a movable step operating mechanism and in particular, to a new and useful multistep entry construction particularly for rail vehicles which includes a linkage for guiding a movable step between a fixed step and a floor or entrance way and which includes an apron associated with the step and depending therefrom which is guided by the linkage for moving the step.

The present invention is particularly applicable for rail vehicles which include a lower fixed step which is at an elevation which is beyond the usual step height from the entrance floor of the vehicle. The space between the fixed step and the entrance floor is bridged by a step which may be positioned at different heights in accordance with the entrance platform requirements. The step is guided in inclined trackways on wall structures on each side of the entrance and it is maintained in its horizontal attitude during the height adjustment thereof. The raising and lowering motinon of the step of the entry is brought about by fluid pressure operated elements in the form of a lifting cylinder having a piston rod which acts on a rotatable steerer which is affixed to a shaft carrying a linkage mechanism. The linkage mechanism is connected at the opposite end thereof to the step and the motion of the step in the upward and downward direction is controlled by the guide slot defined in the entrance wall, and it is kept in its basic position by a spring leg.

The present invention is an improvement over the prior art principally in respect to the simplifying of the guidance of an apron which is associated with the movable step and which is pivoted to the forward end thereof and depends downwardly therefrom to provide a protective surface immediately below the step. The invention provides a connection of the apron to the operating linkage for moving the step so that the apron itself is guided simultaneously by the linkage during the step movement between an inwardly extending and outwardly extending position corresponding to the lower and upper positions of the step.

Accordingly, it is an object of the invention to provide an improved mechanism for shifting a movable step between two elevational levels, for example, for a vehicle entrance way and which includes an inclined slot having guide means for guiding the step while maintaining it in a horizontal orientation and a linkage connected to the step for raising and lowering the step which is also connected to an apron which depends from the forward end of the step in order to provide means for shifting the apron in accordance with the position of the step.

A further object of the invention is to provide a multistep entry particularly for vehicles which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

GENERAL DESCRIPTION OF THE PREFERRED EMBODIMENT

Figure 1:
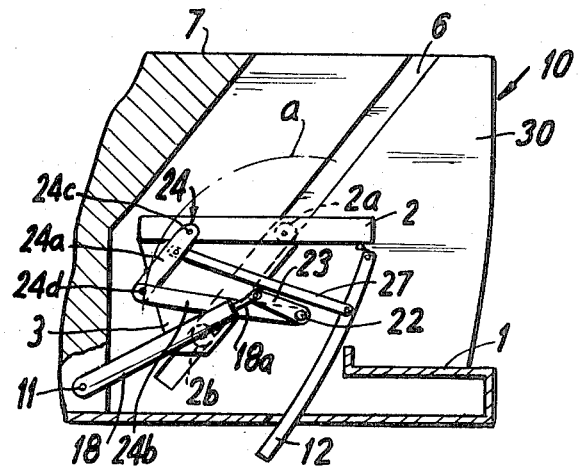
FIG. 1 is a partial sectional view of a vehicle entrance way having a movable step mechanism constructed in accordance with the invention.

Referring to the drawings in particular, the invention embodied therein, comprises a vehicle having an entrance way generally designated 10 which includes a lowermost fixed step portion 1 and an entrance way or entrance floor 7 at an elevation above the fixed step 1.

Figure 3:
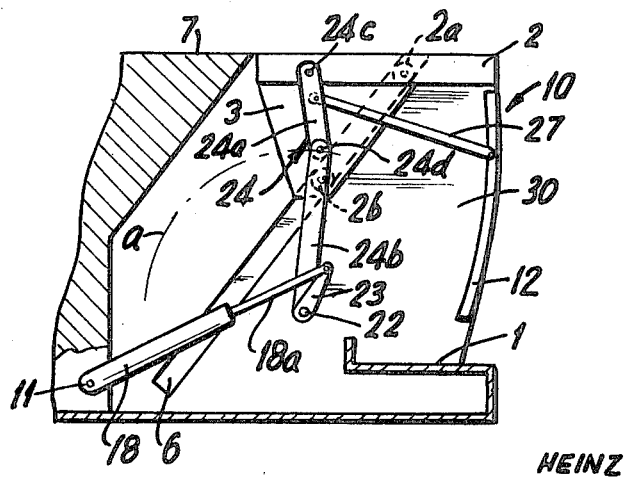
FIG. 3 is a view similar to FIG. 1 with the step indicated in an upper position.

In accordance with the invention, there is provided a movable step 2 which is connected to means for moving it between a lowermost position indicated in FIG. 1 to the uppermost position indicated in FIG. 3. The moving means comprises a fluid pressure operated piston and cylinder combination including a cylinder 18 which is pivoted at 11 to the entrance way structure and which carries a piston rod 18a which is pivoted to a crank lever or steerer 23. The crank lever 23 is affixed to a shaft 22 and the shaft 22 is connected to a linkage mechanism generally designated 24 which has an opposite end connection at 24c to the step 2. The linkage mechanism 24 includes an upper lever 24a which is hinged at 24c to the step 2 and it is pivotally connected at its opposite end at the pivot point 24d to the lower linkage arm member 24b. The linkage arm member 24b is secured to the shaft 22 for rotation therewith and it moves through the circular path indicated a in FIG. 1.

The step 2 is maintained in a horizontal position by guide rollers 2a and 2b which are confined for movement in a slot 6 which is defined in an entrance way wall 30 on each side of the entrance way 10 or an attachment on the wall.

In accordance with a feature of the invention an apron 12 is pivoted to the forward end of the step 2 and it depends therefrom and provides a protective surface in front of the operating mechanism for the step. The apron 12 is moved inwardly when the step 2 is moved to the lower and intermediate position by the movement of the operating mechanism for the step and for this purpose, a rod member 27 is pivotally connected to the lever arm 24a and to the apron 12 intermediate its length.

Figure 2:
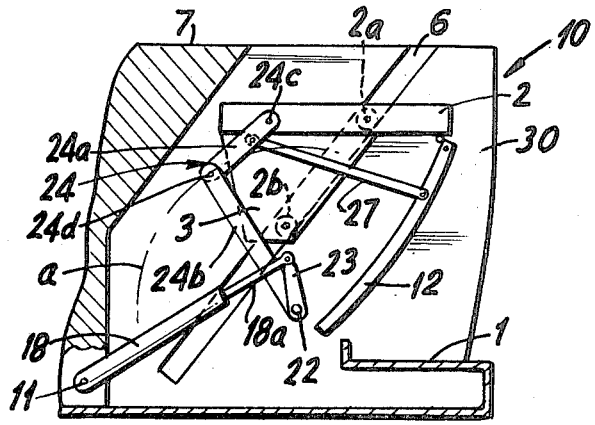
FIG. 2 is a view similar to FIG. 1 indicating the step in an intermediate position.

In order to move the step 2 from its lower position of FIG. 1 into its normal position shown in FIG. 3, the steerer 23 is pivoted clockwise by the fluid pressure operating mechanism 18 and this causes the rotatable movement of the linkage arm 24b and the upward displacement of the linkage arm 24a to raise the step 2. Since the joint 24d in its pivoting motion moves in a circular path about the shaft 22 the lever 24a which is connected to the step 2 in its position approximately parallel to the inclined track 6, is first moved upwardly. Because the lever 24a is linked to the step and because of its connection to the rod 27 the apron 12 is pulled upwardly approximately parallel to its starting position until its lower edge is at the level of, or higher than, the step 1 as shown in FIG. 2. Due to the circular geometry of the rotatable steerer 23, the lever 24 is moved from its position approximately parallel to the track into a vertical position, the chord height increasing slightly whereby the rod 27 pivots the apron 12 so that it forms a part of the side wall 30 when the step 2 is in its normal position as indicated in FIG. 3. The lifting motion is concluded only after the lever linkage 24 has reached its extended condition in which it is longer than the distance transverse by the step 2 from its lowered position into its normal position and has passed through the dead center, in which event shaft 22 and the joint 24c will lie approximately in the same vertical plane.

What is claimed is:

1. A multistep entry particularly for rail vehicles having a fixed outer step at a height lower than the entrance, comprising a movable step having a top normally horizontal step portion, guide channel means engageable with said step for maintaining said step with its step portion substantially horizontal while permitting upward and downward movement between said fixed step and said entrance floor, a linkage connected to said step and having a link arm rotatably mounted at a spaced location from said step, means to rotate said linkage arm to raise and lower said step, an apron articulated to said step and extending therebelow to define a protective wall below said step during the movement of said step, and a rod pivotally connected to said linkage and to said apron and being movable with said linkage to move said apron inwardly and outwardly during downward and upward movement of said step.

2. A multistep entry, according to claim 1, including an arm portion for said step at each side thereof having rollers engaged with said guide channel means and being located between said linkage and said apron.

3. A multistep entry particularly for rail vehicles having a fixed outer step at a height lower than the entrance, comprising a movable step having a top normally horizontal step portion, guide channel means engageable with said step for maintaining said step with its step portion substantially horizontal while permitting upward and downward movement between said fixed step and said entrance floor, a linkage connected to said step and having a link arm rotatably mounted at a spaced location from said step, means to rotate said linkage arm to raise and lower said step, an apron articulated to said step and extending therebelow to define a protective wall below said step during the movement of said step, and a rod pivotally connected to said linkage and to said apron and being movable with said linkage to move said apron inwardly and outwardly during downward and upward movement of said step, said linkage including an upper link arm pivotally connected to said link arm at its one end and to said step at its other end, said rod being connected to said upper link arm at its one end and to said apron at its opposite end.

4. A multistep entry, according to claim 3, wherein said upper lever arm is oriented in a position in which its longitudinal axis extends parallel to said guide channel means when in a lowered position.

5. A multistep entry, according to claim 3, wherein said link arm is rotated beyond a dead center position in the upper position of said step.

* * * * *